United States Patent [19]

Madic et al.

[11] Patent Number: 4,839,149

[45] Date of Patent: Jun. 13, 1989

[54] AMMONIUM PLUTONATE URANATE, ITS PREPARATION PROCESS AND ITS USE FOR PRODUCING THE MIXED OXIDE $(U,Pu)O_2$

[75] Inventors: Charles Madic, Thiais; Jacques de Sanoit, Chevilly-Larue, both of France

[73] Assignee: Commissariat a l'Energie Atomique, Paris, France

[21] Appl. No.: 231,500

[22] Filed: Aug. 12, 1988

[30] Foreign Application Priority Data

Aug. 14, 1987 [FR] France ............................ 87 11600

[51] Int. Cl.[4] .................... C01G 56/00; C01G 43/025; C25C 1/22; G21C 3/62
[52] U.S. Cl. .................................... 423/251; 423/261; 423/15; 252/643; 204/1.5
[58] Field of Search ............... 423/251, 253, 261, 15; 252/643; 204/1.5

[56] References Cited

U.S. PATENT DOCUMENTS

| | | | |
|---|---|---|---|
| 3,287,279 | 11/1966 | Lyon | 252/643 |
| 3,310,386 | 3/1967 | Lloyd | 423/251 |
| 4,235,740 | 11/1980 | Druckenbrodt et al. | 252/643 |
| 4,397,778 | 8/1983 | Lloyd | 252/627 |
| 4,439,279 | 3/1984 | Herrmann et al. | 204/1.5 |
| 4,565,672 | 1/1986 | Schneider et al. | 423/15 |
| 4,749,519 | 6/1988 | Koehly et al. | 423/251 X |

FOREIGN PATENT DOCUMENTS 1180358 of 0000 Fed. Rep. of Germany .

*Primary Examiner*—John F. Terapane
*Assistant Examiner*—Virginia Caress
*Attorney, Agent, or Firm*—Pearne, Gordon, McCoy & Granger

[57] ABSTRACT

The invention relates to an ammonium plutonate uranate, its preparation process and its use for producing the mixed oxide $(U,Pu)O_2$.

The ammonium plutonate uranate of formula $[(U,Pu)O_3]_2 [NH_3]_x[H_2O]_y$ in which x and y have a value from 0 to 5 with $x+y=5$, is prepared by neutralization with ammonia of an aqueous solution of uranium VI and plutonium VI salts, e.g. uranyl and plutonyl nitrates. This solution can be prepared by oxidizing a solution of plutonium IV and uranyl nitrate. By calcining under a reducing atmosphere the ammonium plutonate uranate precipitate formed, a mixed oxide $(U,Pu)O_2$ is obtained having a solubility in 11N $HNO_3$ without fluoride of at least 99.9%.

12 Claims, No Drawings

AMMONIUM PLUTONATE URANATE, ITS PREPARATION PROCESS AND ITS USE FOR PRODUCING THE MIXED OXIDE (U,PU)O₂

The present invention relates to a mixed ammonium plutonate uranate, its preparation process and its use for producing mixed oxides $(U,Pu)O_2$.

Such mixed oxides can be used as nuclear fuels in fast neutron breeder reactors or in water reactors. In the case of fuels intended for breeder reactors, the plutonium content of the mixed oxide is at the most 30% by weight, whereas in the case of water reactors the plutonium content of the mixed oxide must not exceed 10% by weight.

One of the main quality criteria for mixed oxides usable as fuels is their hot solubility in nitric acid solution, in the absence of corrosive agents, such as fluoride ions. Thus, this property is decisive on considering the subsequent reprocessing of the irradiated fuels based on mixed oxides for which it is important to obtain a very quantitative dissolving.

It is known that mixed oxides of uranium and plutonium have a good solubility in a nitric medium only if the plutonium oxide is present in the uranium oxide in the form of a solid solution and various processes for producing mixed oxides are known which make it possible to achieve this objective.

One of these processes consists of mechanically mixing powders of uranium oxide $UO_2$ and plutonium oxide $PuO_2$ and fritting these powders at a very high temperature, of e.g. 1700° C. These operations are repeated several times, i.e. involving grinding of the fritted product and then subjecting the same to a further fritting. Thus, this process is labourious to carry out and requires complex equipment.

Other processes for obtaining mixed oxides of uranium and plutonium are based on the preparation of mixed uranium and plutonium compounds by precipitation on the basis of aqueous solutions. One of these processes consists of jointly precipitating the ammonium uranate and the plutonium hydroxide on the basis of a solution of uranyl nitrate and plutonium IV nitrate and then calcining the precipitate under a reducing atmosphere, as described in U.S. Pat. No. 3,287,279 and in the publications Trans. Ans., Vol. 33, (1979), pp. 470-471.

The disadvantage of this process is that the two actinide elements are present in the precipitate in the form of two different compounds at two different oxidation stages (U VI and Pu IV), so that there is a local accumulation of plutonium which, after calcination, leads to plutonium oxide which is insoluble in the nitric medium alone.

Another process avoiding this disadvantage consists of carying out a true coprecipitation of the uranium and plutonium in the form of a double carbonate of uranium VI, plutonium VI and ammonium, as is described in French Patent No. 2 419 924. The interest of such a process is that the uranium and plutonium elements are present in the same compound in the same oxidation state. In addition, following calcination in a reducing atmosphere of the precipitate, a mixed oxide of uranium and plutonium with good characteristics is obtained.

However, this process suffers from certain disadvantages. Thus, the residual concentration of plutonium and uranium in the filtration mother liquors of the precipitate is high being close to 4 g/l. Moreover, it is necessary to maintain the pH of the solution at a value between 8.4 and 8.6 to obtain coprecipitation and this corresponds to no pH buffer. Moreover, its necessary to use two gaseous flows, which are respectively ammonia and carbon dioxide of which the relative flow rates must be adjusted.

The present invention specifically relates to a process making it possible to coprecipitate uranium and plutonium in the form of a mixed compound, in which the uranium and the plutonium are in the same oxidation state and without suffering from the disadvantages of the process referred to hereinbefore.

It also relates to the novel compound obtained by this process, i.e. the ammonium plutonate uranate of formula:

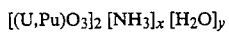

$$[(U,Pu)O_3]_2 [NH_3]_x [H_2O]_y$$

which is a crystalline compound of apparent molar mass 330 g, with $x+y=5$, whereby x and y can assume any value between 0 and 5.

The inventive process for the preparation of mixed ammonium plutonate uranate consists of neutralizing by ammonia an aqueous solution of a uranium VI salt and a plutonium VI salt in order to precipitate the uranium and the plutonium in the form of a mixed ammonium plutonate uranate coprecipitate, followed by the separation of the coprecipitate from the solution.

The obtaining of such a precipitate from an aqueous salt solution of uranium VI and plutonium VI is completely unexpected. Thus, it is known that a reaction of this type can be used for preparing ammonium uranate from aqueous acid solutions of uranium VI and said reaction is widely used in the uranium extraction industry.

However, it has long been known that on applying said same reactions to an aqueous acid solution of plutonium VI, no precipitate is formed, because the plutonium remains in solution in the form of soluble polymerized hydroxo complexes.

Thus, in the process according to the invention, the presence of uranium VI in the solution aids the precipitation of the plutonium which coprecipitates with uranium VI in the form of an isomorphous, crystalline ammonium uranate compound in which U VI and Pu VI must occupy equivalent crystallographic sites.

Moreover, the precipitate formed can easily be separated from the solution and the uranium and plutonium quantities remaining in solution represent less that 0.2% of the initial uranium and plutonium quantity.

Thus, the inventive process is advantageous because it makes it possible to easily obtain a mixed uranium and plutonium compound in which the uranium and the plutonium are in the same oxidation state and said compound can be calcined under a reducing atmosphere to give a mixed uranium and plutonium oxide having very interesting solubility properties in a nitric medium alone.

In general, the uranium and plutonium salts present in the aqueous starting solution are uranyl nitrate and plutonyl nitrate.

Such an aqueous solution can be obtained from a solution of uranyl nitrate and plutonium IV nitrate by oxidising the plutonium IV present in said solution. In this case, the process comprises the following successive stages:

(a) preparing a solution of uranyl nitrate and plutonium IV nitrate, (b) oxidising the plutonium IV present in the solution into plutonium VI and
(c) neutralizing the solution by adding ammonia to form an ammonium plutonate uranate coprecipitate.

In the first stage, the aqueous solution is prepared from corresponding nitrates, which are introduced into an acid solution, e.g. a nitric solution having a $HNO_3$ concentration of 1 to 1.5 mol/l. Preferably, the total U+Pu concentration of the solution does not exceed 200 g/l, because it has been found that the precipitation reaction yield decreases when the U+Pu content increases. The ratio of the uranyl and plutonium nitrates introduced in particular depend on the type of reactor for which the mixed oxide is intended and it could then be formed by calcining the precipitate. Generally, use is made of nitrate quantities such that the U/Pu ratio is at least equal to 3.

After preparing the solution, the second stage of oxidizing the Pu (IV) is carried out and several methods can be used for performing this oxidation.

According to a first embodiment, this oxidation can be carried out at high temperature by means of $NO_3^-$ ions, the phenomenon of oxidizing the plutonium IV into plutonium VI being aided by the presence of uranium VI in solution. For example, this can be carried out by the reflux distillation up to the azeotrope of a $HNO_3$ solution at a temperature of 120° to 150° C.

According to a second embodiment, the oxidation of plutonium IV into plutonium VI can be carried out by electrolysis. This can be performed directly by introducing the aqueous solution of uranyl nitrate and plutonium nitrate into an electrolytic cell subdivided into two anode and cathode compartments by a porous wall having a platinum anode and a tantalum cathode, by applying a sufficiently high potential difference for the oxidation reaction of plutonium IV into plutonium VI, whose apparent normal potential is 1.04 volt/ENH, to take place on the anode. This can be obtained by passing a sufficiently intense constant current into the electrolyzer. It is also possible to carry out this electrolytic oxidation indirectly by using an electrochemical mediator, i.e. a redox pair having a redox potential exceeding that of the plutonium IV-plutonium VI pair. An example of such a redox pair is $Ag^+/Ag^{2+}$.

According to a third embodiment, it is possible to carry out the oxidation chemically by adding an oxidizing agent to the solution, e.g. silver oxide AgO or ozone. Following this oxidation stage, a solution of plutonyl nitrate and uranyl nitrate is obtained.

From this solution is formed a mixed ammonium plutonate uranate precipitate by neutralizing the solution either by an aqueous ammonia solution, or by gaseous ammonia, optionally diluted in an inert gas, such as nitrogen. In general, addition is continued until a pH is obtained on the buffer system $NH_4^+/NH_3$, namely a pH between 9.2 and 9.3.

Following this addition, the precipitate is allowed to age, generally under stirring, for an adequate time and which is at least one hour. The precipitate is then separated from the solution, generally by filtering.

The precipitate obtained can be used for the preparation of mixed oxides $(U,Pu)O_2$. In this case, the mixed ammonium plutonate uranate coprecipitate undergoes drying and then calcining under a reducing atmosphere.

The reducing gas used is generally hydrogen and the calcination temperature is advantageously in the range 650° to 750° C.

The mixed oxide obtained by this process has a solubility in 11N nitric acid on boiling of at least 99.9%.

Other features and advantages of the invention can be gathered from reading the following non-limitative, illustrative examples.

EXAMPLE 1

Preparation of ammonium plutonate uranate

One starts with an aqueous solution containing 1 mol/l of nitric acid and 200 g/l of uranium VI and plutonium IV, the weight ratio U/Pu being equal to 3. The oxidation of the plutonium IV present in this solution is carried out by electrolysis in the presence of the redox pair $Ag^+/Ag^{2+}$.

With this aim in mind, to the solution is added $5.10^{-2}$ mol/l of silver nitrate $AgNO_3$ and the plutonium IV is oxidised to plutonium VI in an electrolyzer having a platinum anode and using the following electrolysis conditions:

anode surface: 8 cm²
current intensity: 60 mA.

Electrolysis is stopped when the anolyte blackens due to the formation of $Ag^{2+}$ ions, which only appear at the end of the plutonium IV oxidation reaction.

Gaseous ammonia is then introduced into the solution by bubbling until a pH close to 9.2 to 9.3 is obtained and this is measured by means of a glass electrode. This ammonia gas addition lasts approximately 20 minutes and is carried out at ambient temperature. A precipitate is formed and is allowed to age under stirring for 2 hours.

The precipitate is then filtered and the uranium and plutonium concentrations of the mother liquors are determined and these are:

0.080 g/l of uranium VI and
0.324 g/l of plutonium VI.

Thus, the precipitation yields are equal to:
uranium yield: 99.94%,
plutonium yield: 99.35%.

The overall precipitation yield (U+Pu) is consequently equal to 99.8%.

It is also found that the $Ag^+$ ions present in the initial solution remain quantitatively in the precipitation mother liquors, probably in the form of amino complexes of $Ag^+$.

EXAMPLE 2

Preparation of mixed ammonium plutonate uranate

The same operating procedure as in Example 1 is adopted starting with a solution of uranyl nitrate and plutonium nitrate, whereof the total U VI and Pu IV content is 61.3 g/l with a U/Pu weight ratio of 3, whereby there is a nitric acid concentration of 1 mol/l. To the solution is added 0.05 mol/l of silver nitrate and then Pu IV is oxidized into Pu VI by electrolysis and precipitation of the ammonium plutonate uranate under the same conditions as in Example 1.

After filtering the precipitate, the plutonium IV and uranium VI concentrations of the filtration mother liquors are determined. The plutonium VI concentration is 1.24 mg/l and the uranium VI is not detectable. Thus, the total precipitation yield exceeds 99.99%.

Following the same operating procedure, uranium and plutonium are coprecipitated on the basis of solutions, whereof the uranium+plutonium concentrations vary from 60 to 200 g/l.

Under these conditions, the total precipitation yield decreases regularly with the increase in the uranium and plutonium concentration of the solution. Nevertheless it remains excellent and always exceeds 99.7%.

EXAMPLE 3

Preparation of ammonium plutonate uranate

The same operating procedure as in Example 1 is used for precipitating ammonium plutonate uranate from a solution containing 69 g/l of uranium and plutonium with a U/Pu weight ratio of 3.2 and a nitric acid concentration of 1 mol/l.

Oxidation and precipitation are carried out under the same conditions as in Example 2. Thus, a mixed ammonium plutonate uranate coprecipitate is obtained, which is identified by X-ray diffraction.

The compound obtained has a diffraction pattern identical to that corresponding to ammonium diuranate, which shows that the two compounds are isomorphous. The most intense diffracted lines correspond to the following interplanar spacings:

$d(Å) = 7.443$ (100%); 3.210 (50%); 3.559 (40%)

The equivalent interplanar spacings of ammonium diuranate are:

$d(Å) = 7.455$ (100%); 3.231 (50%); 3.584 (40%).

EXAMPLE 4

Preparation of mixed plutonium uranium oxide $(U,Pu)O_2$.

An ammonium plutonate uranate precipitate formed by following the same operating procedure as in Example 1 and using as the starting product a solution with the following composition:

$(U+Pu) = 115.06$ g/l,
$U/Pu = 2.63$,
$HNO_3 = 1$ mol/l.

Oxidation and precipitation are carried out by gaseous ammonia under the same conditions as in example 1. The total precipitation yield is 99.89%.

The precipitate is then dried at 100° C. for 30 minutes, followed by calcining at 700° C. for 3 hours in the presence of a gaseous hydrogen-argon mixture containing 10% by volume of hydrogen. After cooling under a reducing atmosphere to 60° C. and in air to ambient temperature, the mixed oxide $(U,Pu)O_2$ obtained undergoes X-ray analysis.

The diffraction pattern of the mixed oxide is the same as that corresponding to uranium dioxide $UO_2$, which shows that the two oxides are isomorphous. They crystallize in the cubic system in face-centred form and the main interplanar spacings observed corresponding to the most intense diffracted lines are:

$(U,Pu)O_2$: $d(Å) = 3.135; 2.717; 1.920; 1.636$,
$UO_2$: $d(Å) = 3.135; 2.721; 1.927; 1.644$.

The thus obtained mixed oxide then undergoes a dissolving test by means of fluoride ion-free nitric acid and carrying out dissolving under the following conditions.

50 mg of mixed oxide $(U,Pu)O_2$ are introduced into 5 ml of a 11.3 mol/l nitric acid solution and refluxing takes place for 6 hours. The solution is cooled, diluted with cold water with a factor equal to 2 and is filtered on a 0.45 μm millipore filter. After rinsing with dilute acid, the filter is subject to the action of 5 ml of a 6 mol/l nitric acid solution containing 0.05 mol/l of fluoride ions with refluxing for 1 hour.

The plutonium content of the solution is then determined. It corresponds to 0.1% of the initial plutonium quantity contained in the mixed oxides subjected to the dissolving test. Thus, the mixed oxide has an excellent solubility in the nitric medium and therefore a good homogeneity.

I claim:

1. Ammonium plutonate uranate of formula:

$$[(U,Pu)O_3]_2 [NH_3]_x [H_2O]_y$$

in which x and y have a value from 0 to 5 with $x + y = 5$.

2. Process for the preparation of ammonium plutonate uranate, characterized in that it comprises neutralizing by ammonia an aqueous solution of a uranium VI salt and a plutonium VI salt for precipitating the uranium and plutonium in the form of an ammonium plutonate uranate coprecipitate and for separating the coprecipitate from the solution.

3. Process according to claim 2, characterized in that the uranium and plutonium salts are uranyl nitrate and plutonyl nitrate.

4. Process according to claim 3, characterized in that it comprises following stages:
   (a) preparing a solution of uranyl nitrate and plutonium IV nitrate
   (b) oxidizing the plutonium IV present in the solution into plutonium VI and
   (c) neutralizing the solution by adding ammonia to form an ammonium plutonate uranate coprecipitate.

5. Process according to claim 4, characterized in that the plutonium IV is oxidized into plutonium VI by adding $NO_3^-$ ions at elevated temperature.

6. Process according to claim 4, characterized in that the oxidation of plutonium IV into plutonium VI is carried out by electrolysis.

7. Process according to claim 6, characterized in that electrolysis is carried out in the presence of an electrochemical mediator with a redox potential above that of the plutonium IV - plutonium VI pair.

8. Process according to claim 4, characterized in that oxidation of plutonium IV into plutonium VI takes place by adding silver oxide AgO.

9. Process according to claim 4, characterized in that plutonium IV is oxidised into plutonium VI by means of ozone.

10. Process according to either of the claims 2 and 4, characterized in that neutralization takes place by means of gaseous ammonia.

11. Process according to either of the claims 2 and 4, characterized in that neutralization takes place by adding an aqueous ammonia solution.

12. Process according to claim 11, characterized in that neutralization is carried out so as to obtain a pH between 9.2 and 9.3.

* * * * *